(12) United States Patent
Savarese et al.

(10) Patent No.: US 9,550,629 B2
(45) Date of Patent: Jan. 24, 2017

(54) APPARATUS FOR DISPENSING MATERIAL

(71) Applicant: Columbia PhytoTechnology, LLC, The Dalles, OR (US)

(72) Inventors: Mark Savarese, Hood River, OR (US); Jeffery J. Williams, The Dalles, OR (US)

(73) Assignee: Columbia Phytotechnology. LLC, The Dalles, OR (US)

(*) Notice: Subject to any disclaimer, the term of this patent is extended or adjusted under 35 U.S.C. 154(b) by 0 days.

(21) Appl. No.: 14/745,191

(22) Filed: Jun. 19, 2015

(65) Prior Publication Data

US 2015/0284189 A1 Oct. 8, 2015

Related U.S. Application Data

(62) Division of application No. 13/420,294, filed on Mar. 14, 2012, now Pat. No. 9,073,711.

(60) Provisional application No. 61/453,483, filed on Mar. 16, 2011.

(51) Int. Cl.
*G01F 11/00* (2006.01)
*B65G 31/04* (2006.01)
*B65G 65/48* (2006.01)
*F26B 25/00* (2006.01)
*F26B 1/00* (2006.01)
*F26B 3/30* (2006.01)
*F26B 17/04* (2006.01)

(52) U.S. Cl.
CPC ........... *B65G 31/04* (2013.01); *B65G 65/4881* (2013.01); *F26B 25/002* (2013.01); *F26B 1/005* (2013.01); *F26B 3/30* (2013.01); *F26B 17/04* (2013.01)

(58) Field of Classification Search
CPC .. B65G 65/4881; B65G 65/4836; F26B 1/005; B65D 88/68; B01F 13/1041
See application file for complete search history.

(56) References Cited

U.S. PATENT DOCUMENTS

| 23,981 | A | | 5/1859 | Learned | |
|---|---|---|---|---|---|
| 164,304 | A | * | 6/1875 | Jenkins | ................... B65D 88/68 222/201 |
| 195,959 | A | * | 10/1877 | Sims | ...................... A01C 15/16 222/410 |
| 198,581 | A | * | 12/1877 | Domschke | ......... B65G 65/4836 222/227 |
| 262,498 | A | * | 8/1882 | Strayer | .............. B65G 65/4836 222/240 |

(Continued)

OTHER PUBLICATIONS

International Search Report on Patentability and Written Opinion of the International Searching Authority, mailed Jun. 20, 2012, for corresponding International Application No. PCT/US2012/029283, 10 pages.

(Continued)

*Primary Examiner* — Frederick C Nicolas
*Assistant Examiner* — Randall Gruby
(74) *Attorney, Agent, or Firm* — Klarquist Sparkman, LLP

(57) ABSTRACT

An apparatus for dispensing material includes an outlet opening with a perforated cover. A rotatable applicator dispenses material through the perforated cover and may include brushes that sweep across and penetrate the openings of the perforated cover. The housing may also contain a feed roller for regulating the flow of the material and one or more commutators for fractionating the material.

19 Claims, 7 Drawing Sheets

(56) References Cited

U.S. PATENT DOCUMENTS

| | | | | |
|---|---|---|---|---|
| 319,311 | A | 6/1885 | Peters | |
| 366,476 | A * | 7/1887 | Graumlich | B65G 65/4836 222/227 |
| 384,568 | A | 6/1888 | Evans | |
| 393,907 | A * | 12/1888 | Howell | A01C 15/16 222/410 |
| 412,061 | A * | 10/1889 | Allen | B65D 88/68 222/241 |
| 465,815 | A | 12/1891 | Claus | |
| 578,952 | A * | 3/1897 | Tellefsen | B02C 13/26 222/189.02 |
| 720,128 | A | 2/1903 | Gheen | |
| 721,733 | A * | 3/1903 | Nance | A01C 15/007 111/173 |
| 773,818 | A | 11/1904 | Smith | |
| 840,686 | A | 1/1907 | Brook | |
| 854,165 | A | 5/1907 | Hodge | |
| 1,062,766 | A | 5/1913 | Carter | |
| 1,413,345 | A | 4/1922 | Morris | |
| 1,433,724 | A | 10/1922 | Hughes | |
| 1,469,635 | A | 10/1923 | Feasler | |
| 1,546,411 | A | 7/1925 | Short | |
| 1,557,106 | A | 10/1925 | Tow et al. | |
| 1,739,149 | A | 12/1929 | Heim | |
| 1,872,028 | A | 8/1932 | Collins | |
| 2,089,215 | A * | 8/1937 | Lomax | A47J 43/145 210/383 |
| 2,097,102 | A | 10/1937 | Moore | |
| 2,098,246 | A | 11/1937 | Jarrier | |
| 2,200,757 | A | 5/1940 | Miller | |
| 2,248,700 | A | 7/1941 | Finnell | |
| 2,301,589 | A | 11/1942 | Shepard | |
| 2,355,358 | A * | 8/1944 | Anderson | B02C 13/26 241/101.78 |
| 2,498,833 | A | 2/1950 | Weyer | |
| 2,515,166 | A * | 7/1950 | Wadleigh | B65G 47/1492 198/454 |
| 2,551,853 | A | 5/1951 | Schill | |
| 2,566,210 | A * | 8/1951 | Kendall | B65B 57/145 177/121 |
| 2,593,516 | A | 4/1952 | Alley et al. | |
| 2,645,384 | A * | 7/1953 | Juzwiak | A01C 15/16 222/240 |
| 2,655,411 | A * | 10/1953 | Smith | B01J 8/002 208/164 |
| 2,658,604 | A * | 11/1953 | Erdmenger | B65G 65/46 198/533 |
| 2,681,637 | A * | 6/1954 | Simpson | D21H 23/64 118/308 |
| 2,696,331 | A * | 12/1954 | Fahrni | B27N 3/14 222/227 |
| 2,704,521 | A * | 3/1955 | Sharp | A01J 21/02 264/148 |
| 2,713,442 | A | 7/1955 | McFarling et al. | |
| 2,720,341 | A * | 10/1955 | Stirn | G01F 11/24 193/25 R |
| 2,782,963 | A | 2/1957 | Erdmenger | |
| 2,792,153 | A * | 5/1957 | Douglass, Jr. | B65D 88/68 222/226 |
| 2,794,454 | A * | 6/1957 | Moulthrop | B68G 7/06 141/67 |
| 2,922,549 | A * | 1/1960 | Willwerth | A01C 15/00 222/310 |
| 2,980,290 | A * | 4/1961 | Fahrni | B65G 47/00 141/131 |
| 3,035,740 | A * | 5/1962 | Burch | A01C 15/00 222/139 |
| 3,036,745 | A * | 5/1962 | Johnson | B65B 39/04 222/136 |
| 3,038,643 | A * | 6/1962 | Van Der Lely | A01C 17/00 222/227 |
| 3,066,831 | A * | 12/1962 | Thompson | B01F 15/0235 222/239 |
| 3,070,264 | A * | 12/1962 | La Mar Christy | A21C 9/04 222/185.1 |
| 3,131,911 | A | 5/1964 | Geerlings | |
| 3,145,882 | A | 8/1964 | Quackenbush | |
| 3,149,760 | A | 9/1964 | Eichorn et al. | |
| 3,182,968 | A * | 5/1965 | Geerlings | A01K 5/0275 366/142 |
| 3,195,775 | A * | 7/1965 | Thomas | A01K 5/0275 222/202 |
| 3,223,288 | A | 12/1965 | Stern | |
| 3,280,973 | A | 10/1966 | Cartwright et al. | |
| 3,529,870 | A | 9/1970 | Woten | |
| 3,601,289 | A * | 8/1971 | Gustafson | A01M 9/0092 222/238 |
| 3,776,430 | A | 12/1973 | Gandrud | |
| 3,817,206 | A * | 6/1974 | Case | A23G 3/2076 118/17 |
| 4,037,759 | A | 7/1977 | Grosse-Scharmann et al. | |
| 4,111,493 | A | 9/1978 | Sperber | |
| 4,236,654 | A | 12/1980 | Mello | |
| 4,365,762 | A * | 12/1982 | Hoshall | B02C 18/14 241/189.1 |
| 4,411,390 | A | 10/1983 | Woten | |
| 4,465,239 | A | 8/1984 | Woten | |
| 4,492,321 | A | 1/1985 | Zoltner | |
| 4,498,635 | A | 2/1985 | Fielding | |
| 4,595,128 | A | 6/1986 | Fielding | |
| 4,631,837 | A | 12/1986 | Magoon | |
| 4,896,615 | A | 1/1990 | Hood et al. | |
| 4,978,252 | A | 12/1990 | Sperber | |
| 5,054,934 | A * | 10/1991 | Kintz | A47G 19/34 222/189.02 |
| 5,135,122 | A | 8/1992 | Gross et al. | |
| 5,188,262 | A | 2/1993 | Fielding | |
| 5,253,578 | A * | 10/1993 | Hsu | B01F 1/00 366/154.2 |
| 5,307,952 | A | 5/1994 | Worrel et al. | |
| 5,469,971 | A | 11/1995 | Chilton et al. | |
| 5,697,704 | A * | 12/1997 | Coyle | B01F 7/042 209/3 |
| 5,829,649 | A | 11/1998 | Horton | |
| 6,109,488 | A | 8/2000 | Horton | |
| 6,113,968 | A | 9/2000 | McGuire et al. | |
| 6,119,624 | A | 9/2000 | Morikawa et al. | |
| 6,161,784 | A | 12/2000 | Horton | |
| 6,216,753 | B1 * | 4/2001 | Kanzler | B65B 1/08 141/10 |
| 6,539,645 | B2 | 4/2003 | Savarese | |
| 7,938,348 | B2 * | 5/2011 | Evans | B02C 18/2216 241/225 |
| 7,971,813 | B2 * | 7/2011 | O'Leary | B02C 18/2216 241/18 |
| 8,025,188 | B2 * | 9/2011 | White | B65B 1/366 222/227 |
| 8,894,272 | B2 * | 11/2014 | Kato | B01F 3/18 366/155.1 |
| 8,894,811 | B1 * | 11/2014 | Brown | D21H 13/40 162/145 |
| 8,915,406 | B2 * | 12/2014 | Hu | A47J 31/404 222/1 |
| 2002/0040643 | A1 * | 4/2002 | Ware | A23B 7/0205 99/467 |
| 2006/0231570 | A1 * | 10/2006 | Ramirez-Delgado | A61C 9/0026 222/64 |
| 2009/0169694 | A1 | 7/2009 | Fleisch et al. | |
| 2010/0021603 | A1 | 1/2010 | Madsen et al. | |
| 2010/0264243 | A1 | 10/2010 | Bickley et al. | |
| 2011/0226814 | A1 * | 9/2011 | Evans | E04F 21/085 222/190 |
| 2013/0020422 | A1 * | 1/2013 | Bynelius | B02C 18/2291 241/28 |
| 2014/0190031 | A1 * | 7/2014 | Wada | B02C 13/282 34/61 |

(56) References Cited

U.S. PATENT DOCUMENTS

2014/0356108 A1* 12/2014 Hanses .................. B65G 65/46
414/292

OTHER PUBLICATIONS

Office Action from the United States Patent & Trademark Office in U.S. Appl. No. 13/420,294, dated May 21, 2014.
Notice of Allowance from the United States Patent & Trademark Office in U.S. Appl. No. 13/420,294, dated Mar. 2, 2015.

* cited by examiner

APPARATUS FOR DISPENSING MATERIAL

CROSS REFERENCE TO RELATED APPLICATION

This application is a divisional of U.S. patent application Ser. No. 13/420,294, filed on Mar. 14, 2012, which claims the benefit of U.S. Provisional Application No. 61/453,483, filed Mar. 16, 2011, both of which are incorporated by reference herein in their entireties.

FIELD

The present disclosure concerns embodiments of an apparatus for dispensing material, such as for dispensing a food product onto a food dryer.

BACKGROUND

U.S. Pat. No. 6,539,645 discloses a drying apparatus for drying products which are in the form of liquids or semi-liquids such as colloidal suspensions and the like. The drying apparatus disclosed in the '645 patent comprises a conveyor belt and a plurality of radiant heat sources, such as infrared heaters, that remove moisture from product being conveyed along the conveyor belt. Drying efficiency and the consistency at which product can be dried depend in large part on the ability to apply an even and consistent layer of product having a predetermined thickness onto the conveyor surface. When drying product that contains relatively large pieces of material and/or material that tends to agglomerate or adhere together when handled, such as fruit pulp, it is sometimes difficult to dispense product in a manner that applies an even and consistent layer of material onto the conveyor surface. Accordingly, there is a need for an improved dispensing apparatus, such as can be used to dispense product onto a conveyor surface for drying.

SUMMARY

According to one embodiment, an apparatus for dispensing material includes a housing with inlet and outlet openings and a path extending from the inlet opening to the outlet opening through which material to be dispensed travels. A stationary perforated cover at least partially covers the outlet opening, and a rotatable applicator within the housing dispenses material through the perforated cover.

According to another embodiment, material is introduced into a dispensing apparatus comprising a housing. Material is dispensed through a perforated cover of the housing by a rotating applicator that brushes the material against the perforated cover.

According to another embodiment, a system for drying material includes a dispensing apparatus comprising a housing with inlet and outlet openings, a rotatable applicator within the housing, and a perforated cover on the outlet opening. The dispensing apparatus dispenses material through the perforated cover. A conveying apparatus receives material dispensed from the dispensing apparatus, and a drying apparatus removes moisture from the material on the conveying apparatus.

According to another embodiment, an apparatus for dispensing material comprises a housing comprising inlet and outlet openings and a flow path extending from the inlet opening to the outlet opening through which material to be dispensed travels. Additionally, a stationary screen at least partially covers the outlet opening. Additionally, a rotatable applicator within the housing and comprising a plurality of brushes, each with a plurality of flexible bristles, is configured and positioned to sweep material across and to dispense material through the screen. At least a portion of the bristles can extend through openings in the screen when the applicator is rotated relative to the screen, and at least a portion of bristles that extend through the screen comprise end portions that can extend past the screen. Additionally, the housing also comprises a feed roller, for regulating the amount of material flowing through the housing, and a rotatable commutator, below the feed roller, and above the applicator, for fractionating the material. Additionally, the housing can comprise an upper housing portion and a lower housing portion as parts of the housing. The upper housing portion can define the inlet opening, and the lower housing portion can define the outlet opening. A transfer opening can be defined between the internal space of the upper housing portion and the internal space of the lower housing portion. The transfer opening desirably is positioned at or near the lower end of the upper housing and opens into the lower housing. The flow path extends from the inlet opening through the transfer opening and to the outlet opening.

DETAILED DESCRIPTION

The present disclosure concerns embodiments of an apparatus for dispensing material. The disclosed embodiments are particularly suited for dispensing product containing relatively large pieces of material and/or a moist material that tend to agglomerate or adhere together, such as fruit or vegetable pulp, onto a conveyor belt or similar device for further processing. For example, the disclosed embodiments are particularly suited to apply a layer of moist material having a predetermined thickness onto the conveyor belt of a drying apparatus that dries the material. However, it will be appreciated that the disclosed embodiments can be used to handle and dispense other types of material, including liquids, colloidal suspensions, solutions, paste, granular material, powders, and combinations thereof. The apparatus is particularly suited for dispensing fruit and vegetable pulps and pieces of fruit, vegetables, and plant matter. Some specific examples of material that can be handled and dispensed with the apparatus include carrot pulp, apple pulp, citrus pulp (e.g., lemon, orange, etc.), and plant material, such as leaves or roots.

Figure 1:
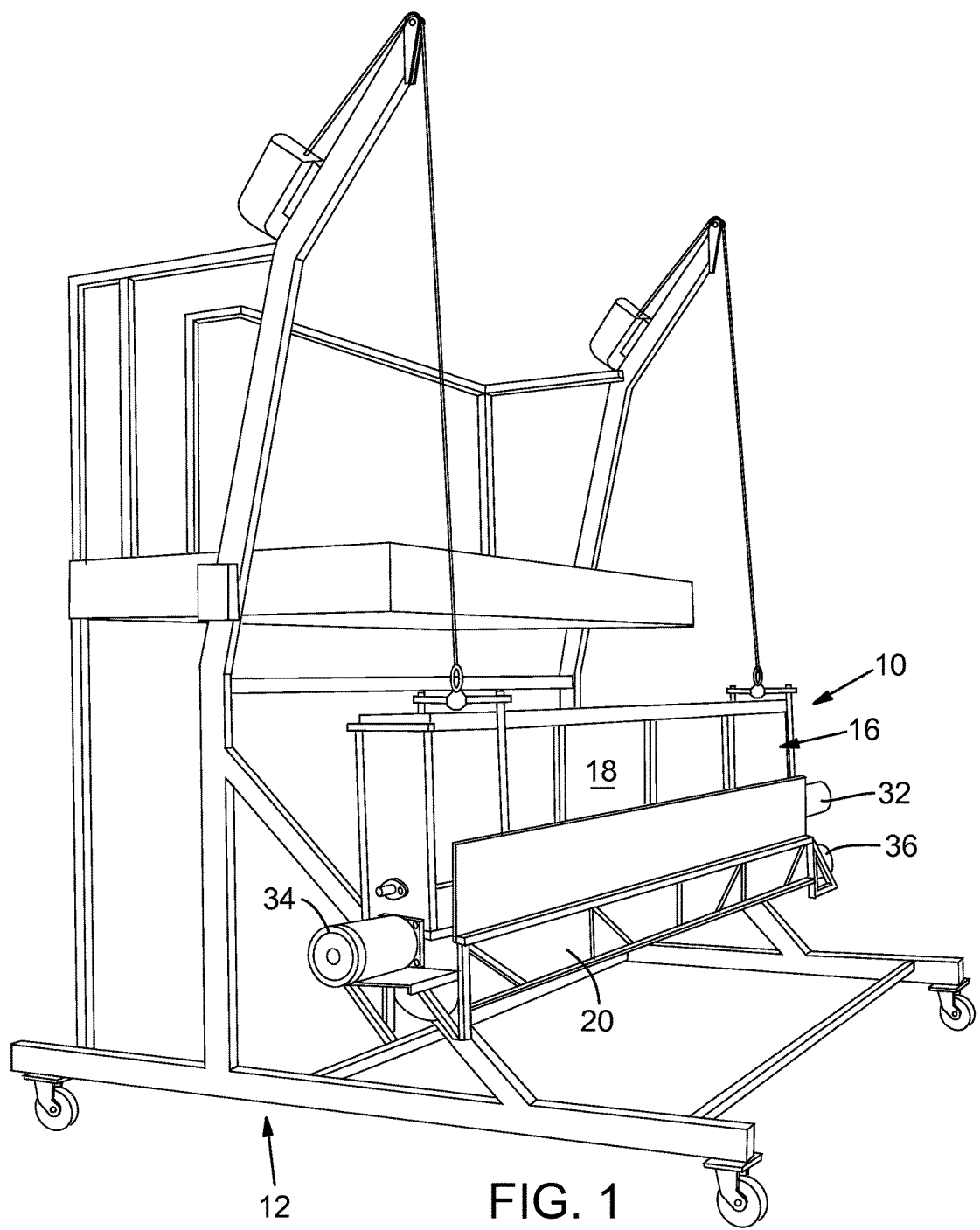
FIG. 1 is a front perspective view of a dispensing apparatus supported on a hoist device, according to one embodiment.

FIG. 1 shows a dispensing apparatus 10, according to one embodiment. The dispensing apparatus 10 is shown supported by a hoist device 12, which can be used to support the dispensing apparatus at a particular location for use or storage. For example, the hoist device 12 can be used to support the dispensing apparatus above the conveyor of a drying apparatus that dries material dispensed from the dispensing apparatus onto the conveyor.

Figure 2:
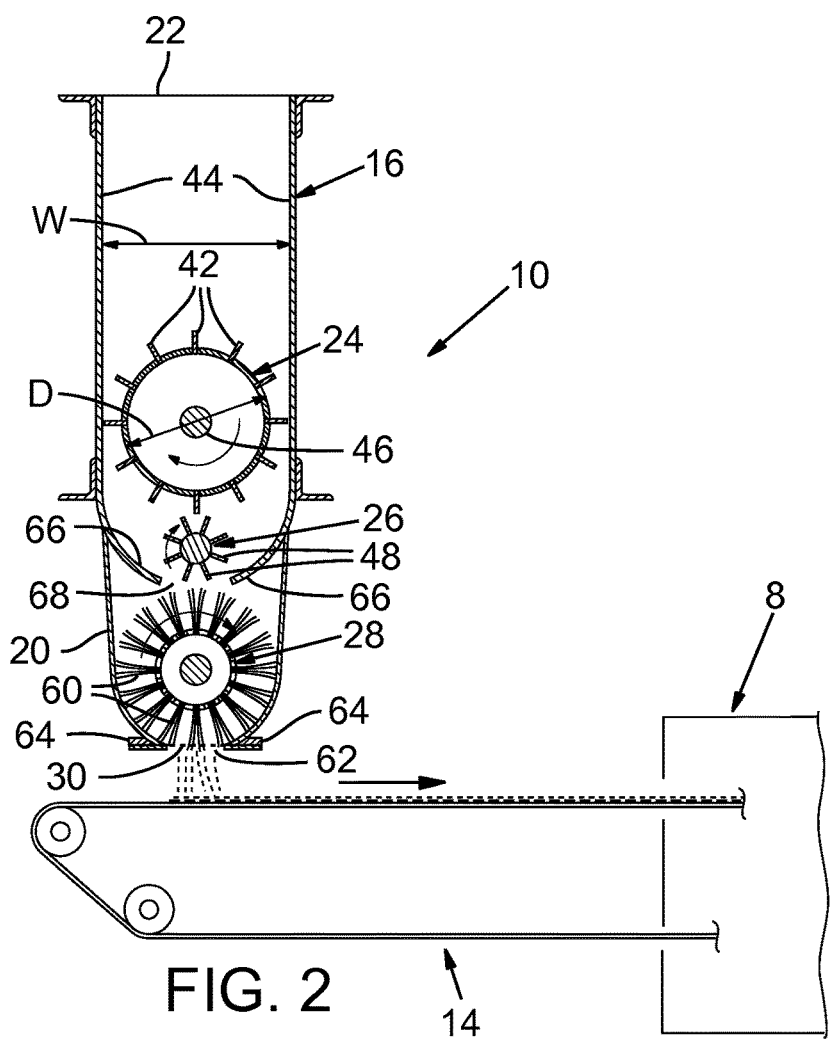
FIG. 2 is a cross-sectional view of the dispensing apparatus of FIG. 1.

FIG. 2 is a schematic, cross-sectional view of the dispensing apparatus 10 supported above a conveyor 14 of a drying apparatus 8. The conveyor 14 can be, for example, the conveyor of a drying apparatus that utilizes infrared radiant heat sources to remove moisture from material being conveyed through the drying apparatus. The drying apparatus 8 can also be used to sterilize material, such as plant leaves or roots. Such a drying apparatus is disclosed in U.S. Pat. No. 6,539,645, which is incorporated herein by reference. The dispensing apparatus 10 includes a housing 16, which can include an upper housing portion 18 and a lower housing portion 20. The upper and lower housing portions may be physically joinable and separable components, or they may be portions of one contiguous housing component, in which case the two portions are demarcated as the sub-volume of the housing above rotatable applicator 28 and the sub-volume containing the applicator 28. The top of the housing 16 includes an inlet opening 22 for introducing material into the dispensing apparatus. For example, material to be dispensed onto the conveyor 14 (e.g., fruit pulp) can be fed from an auger or pumped from a storage container into the upper housing portion 18.

In an embodiment, the upper housing portion 18 may house rotating components such as a feed roller 24 and a commutator, or agitator, 26 mounted below the feed roller 24. The feed roller 24 compartmentalizes, regulates the flow of, and displaces material through the dispensing apparatus, while the commutator 26 assists in fractionating or breaking up material that tends to agglomerate as it is pushed through the dispensing apparatus by the feed roller.

In an embodiment, the material moves along a path through the housing 16 extending from the inlet opening 22 to the outlet opening 62 as shown in FIG. 2. In an embodiment, the housing 16 and the path are more nearly vertical than horizontal, and material moves from a higher position at the inlet opening to a lower position at the outlet opening.

The concept of a cross-section may be used to define an area in a plane roughly perpendicular to the flow path. At each location along the path, there is a housing cross-section defining an area across the interior of the housing 16, 18, or 20 at that height, the plane of the housing cross-section being more nearly horizontal than vertical. In FIG. 2, W indicates the width of this housing cross-section at an example height. Also at each location along the path, there is a flow cross-section defined as the housing cross-section at a given height less the minimum cross-section of any components in the flow path at that height. "Minimum cross-section" refers to the horizontal cross-section of a rotatable component when the housing 16 is vertical and that rotatable component is rotated to present the least cross-section blocking flow. For example, in the case of the feed roller 24, this would be the cross-section of the roller having a diameter D and would not include the extent of the blades 42. Thus the flow cross-section defines the maximum cross-section of the flow path at a given height within the housing. In an embodiment, the feed roller 24 is a component within the housing whose cross-sectional area is subtracted from the housing cross-section to calculate the flow cross-section at a height containing a portion of the feed roller. In FIG. 2, D indicates the external diameter of the feed roller cross-section, neglecting the blades of the feed roller. In particular embodiments, the diameter D of the feed roller is at least 70% of the housing cross-section or width at the same height, at least 80% in some embodiments, or at least 90% in some embodiments.

The feed roller 24 may rotate in the direction shown in FIG. 2, or it may rotate in the opposite direction. The direction of rotation of the feed roller 24 may be reversed in order to dislodge material from the feed roller. The commutator 26 may rotate in the direction shown in FIG. 2, or it may rotate in the opposite direction. The feed roller 24 and the commutator 26 may rotate in the same or opposing directions.

Figure 8:
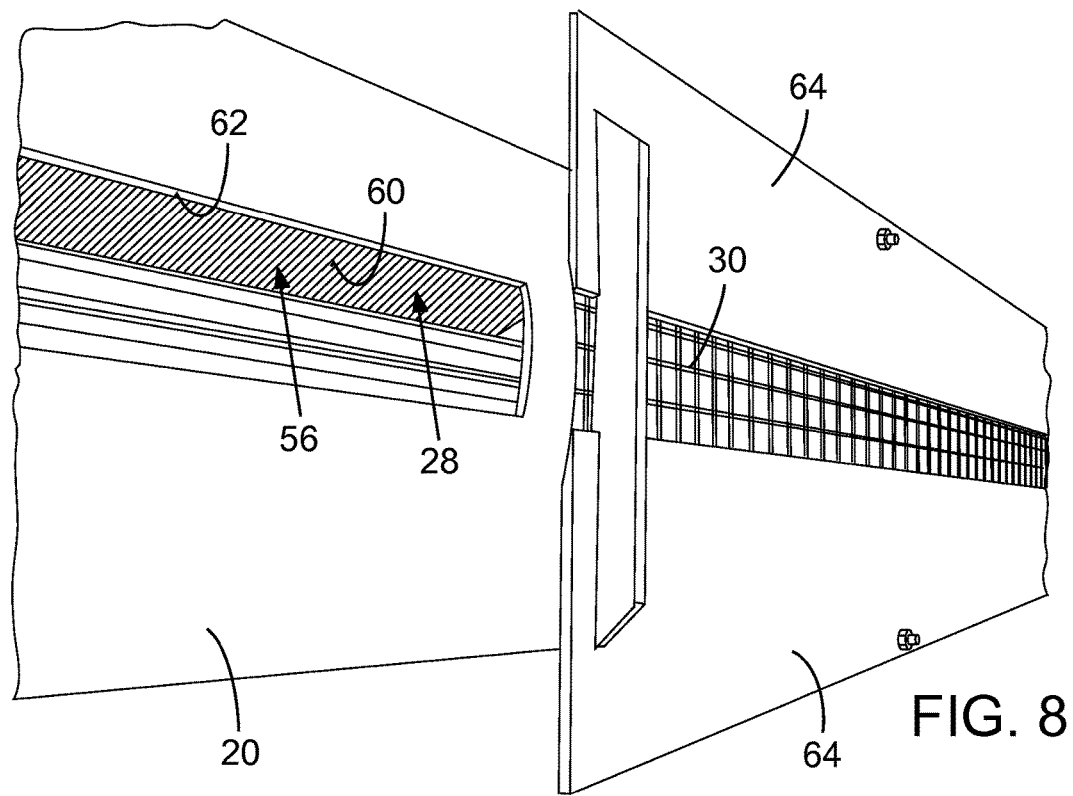
FIG. 8 is an enlarged perspective view showing a portion of the underside of the dispensing apparatus including a perforated cover comprising a screen.
Figure 10:
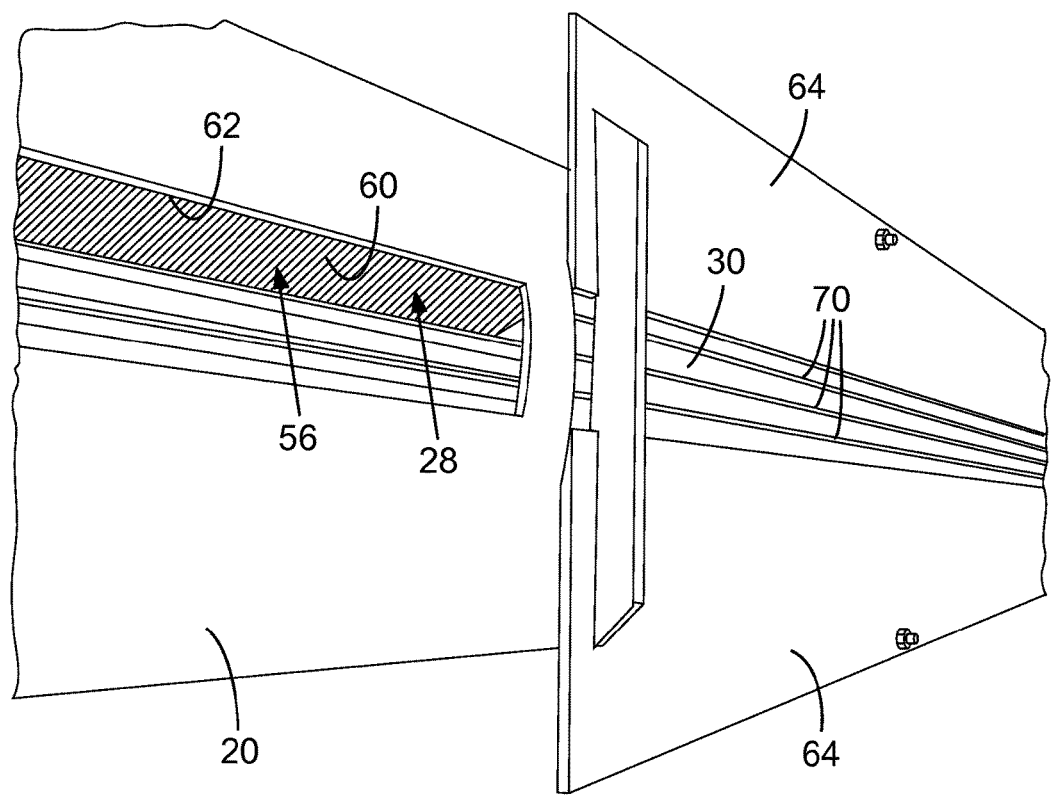
FIG. 10 is a view similar to FIG. 8 showing a perforated cover comprising a plurality of elongated bars.

The lower housing portion 20 houses an applicator 28 that is configured to sweep material across a perforated cover 30, which in an embodiment may be a screen as in FIG. 8 or in another embodiment may be a plurality of elongated elements, for example bars, forming a grill as in FIG. 10, at least partially covering an outlet opening 62 at the bottom of the housing 16. The term "perforated cover" as used herein includes a cover comprising a plurality of openings or apertures, such as in the form of a screen (e.g., a wire screen), a sheet of material formed with a plurality of openings (e.g., a sheet of metal with openings formed therein), or a piece of grating (e.g., a section of expanded metal). The perforated cover can also comprise a plurality of elongated slots, such as in a grill. In any case, the configuration of the perforated cover may be comprised of wire as in a screen or adaptations of a screen or it may be comprised of bars as in a grill or adaptions of a grill. The material of these wires or bars may be metal or plastic or another material able to withstand flow through the dispensing apparatus and desirably comprises a suitable food grade material if the dispensing apparatus is used to dispense foot stuff. Additionally, in the case of elongated slots, the long axis of slots may parallel the long axis of the outlet opening (perpendicular to the width W of the housing), as in FIG. 10, or shorter slots instead may parallel the short axis of the outlet opening (parallel to the width W of the housing). The action of the applicator 28 sweeping material across the perforated cover 30 further breaks up the material and causes agglomerates of a predetermined size to be displaced through the perforated cover 30, out the outlet opening 62, and dispensed evenly across the conveyor surface.

The applicator 28 may rotate in the direction shown in FIG. 2, or it may rotate in the opposite direction. The applicator 28 and the commutator 26 may rotate in the same or opposing directions.

Referring again to FIG. 1, the upper housing 18 can be formed from a suitable plastic, such as HDPE (high-density polyethylene) or UHMW (ultra-high-molecular-weight polyethylene), or a suitable metal, such as stainless steel. The lower housing 20 can be formed from a section of PVC pipe. In alternative embodiments, the entire housing 16, including the upper and lower housing portions, can be fabricated from stainless steel.

Figure 3:
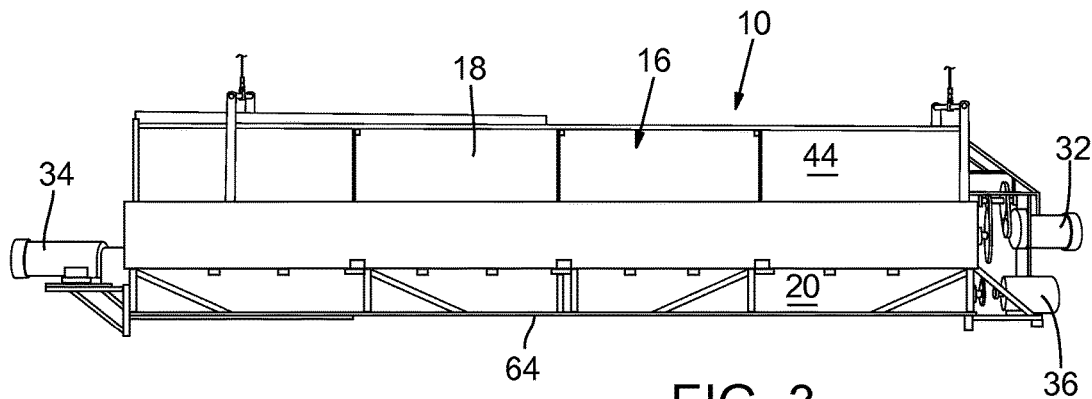
FIG. 3 is a rear elevation view of the dispensing apparatus of FIG. 1.
Figure 4:
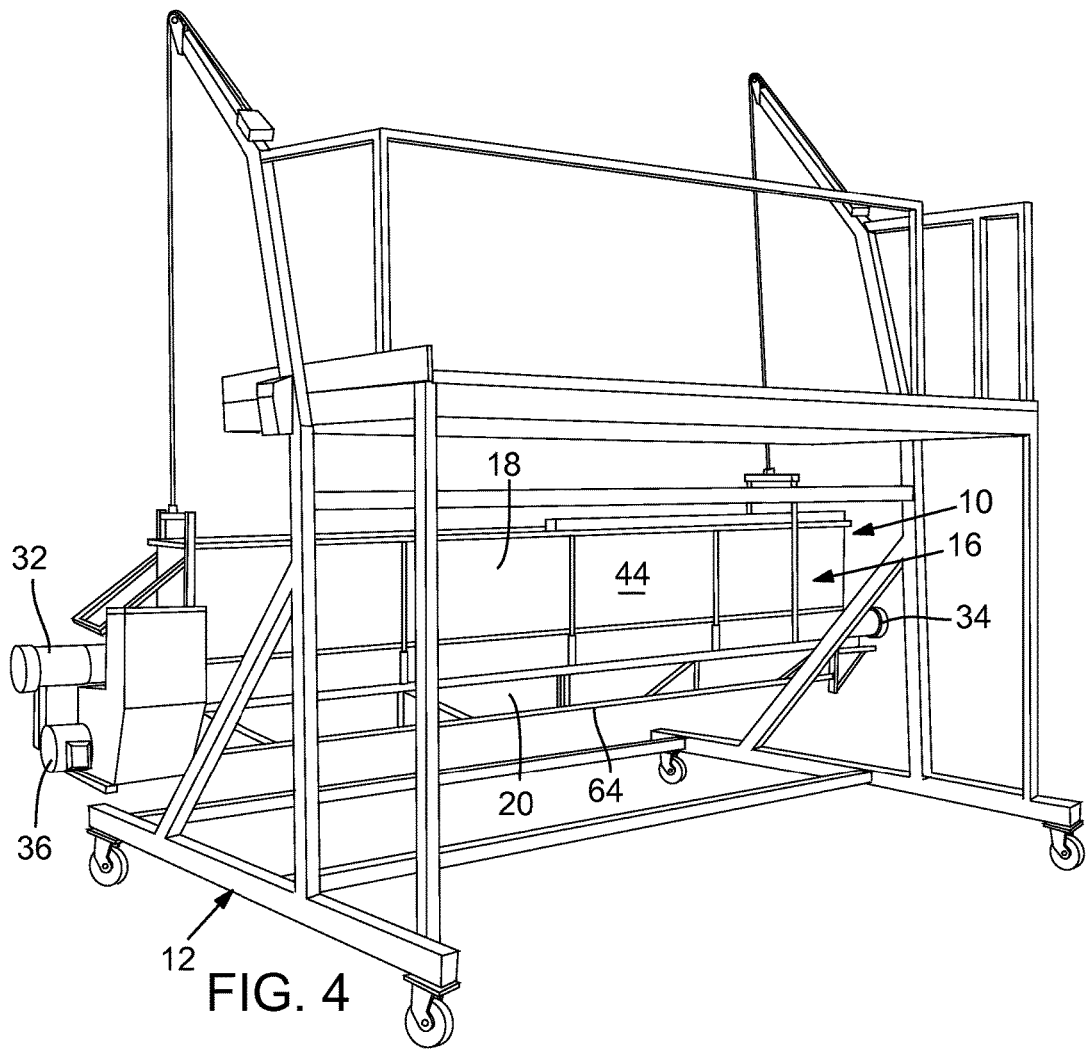
FIG. 4 is a rear perspective view of the dispensing apparatus of FIG. 1.

As best shown in FIGS. 3 and 4, each of the feed roller 24, commutator 26, and applicator 28 can be driven by a respective motor or other power source. In the illustrated embodiment, for example, the feed roller 24 is operatively connected to a first motor 32, the commutator 26 is operatively connected to a second motor 34, and the applicator 28 is operatively connected to a third motor 36. The feed roller 24 is rotated at a predetermined speed to achieve a desired thickness of product dispensed onto the conveyor 14. The commutator 26 desirably is rotated at a much faster rate than the feed roller to ensure that agglomerates are adequately broken up or otherwise separated into smaller pieces before passing into the lower housing compartment containing the applicator. Desirably, the applicator 28 also is rotated at a much faster rate than the feed roller 24.

Figure 5:
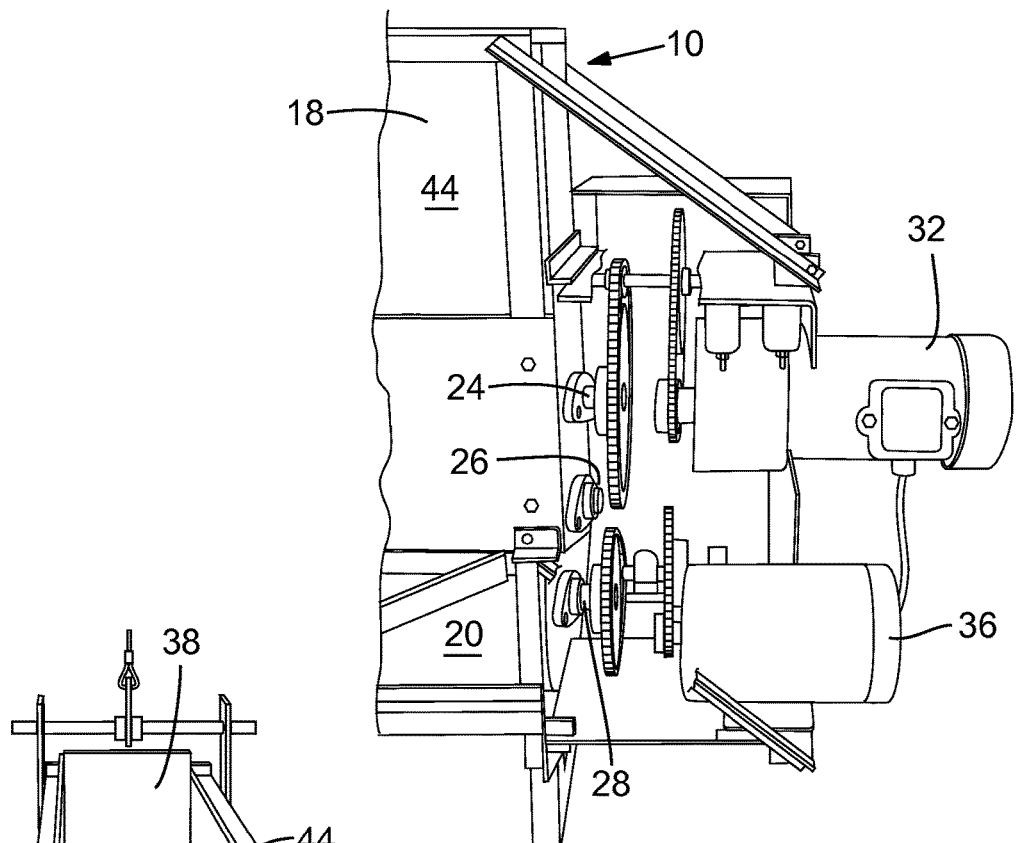
FIG. 5 is an enlarged view of two motors and respective drive assemblies of the dispensing apparatus of FIG. 1.

Various techniques or mechanisms can be used to transmit rotational movement of the motors to the feed roller, commutator, and applicator and to control the speed of the motors. As shown in FIG. 5, for example, chain and sprocket drives can be used to transmit rotational movement of the motors to the respective shafts of the feed roller, commutator, and applicator. The motors 32, 34, 36 can be in communication with a controller (not shown) that is operable to increase and decrease the speed of each of the motors. For example, in order to increase the thickness of the layer of material dispensed onto the conveyor 14, the controller can be operated to increase the speed of the motors and therefore the throughput of the dispensing apparatus.

In particular embodiments, the feed roller 24 can be operated at a speed in a range of about 0.3 rpm to about 0.9 rpm, with 0.6 rpm being a specific example. The commutator 26 can be operated at a speed in a range of about 500 rpm to about 1000 rpm, with about 750 rpm being a specific example. The applicator 28 can be operated at a speed in a range of about 120 rpm to about 215 rpm, with about 180 rpm being a specific example. The speeds of the feed roller, commutator, and/or the applicator can be greater or less than the specified ranges, depending on the particular application.

Figure 6:
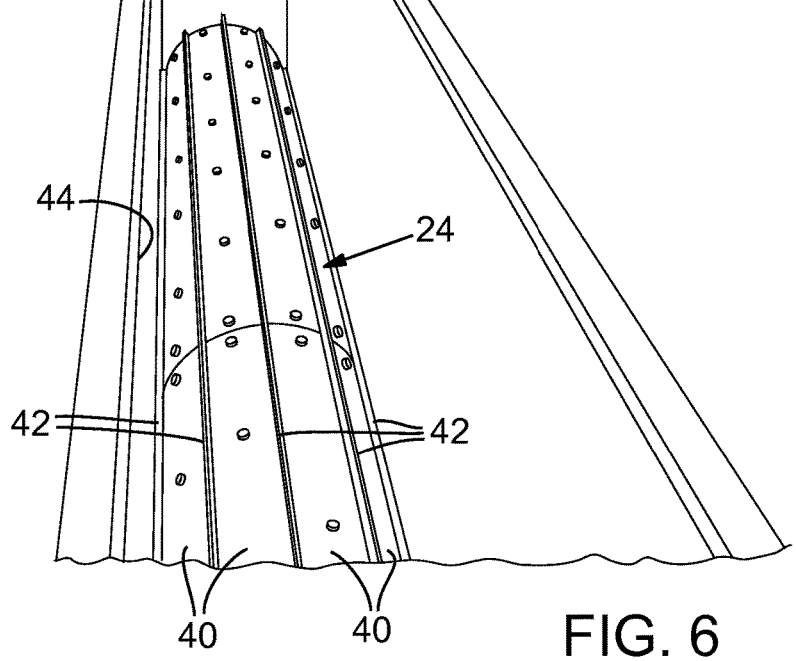
FIG. 6 shows the inside of the dispensing apparatus, as viewed through the inlet opening at the top of the dispensing apparatus.
Figure 7:
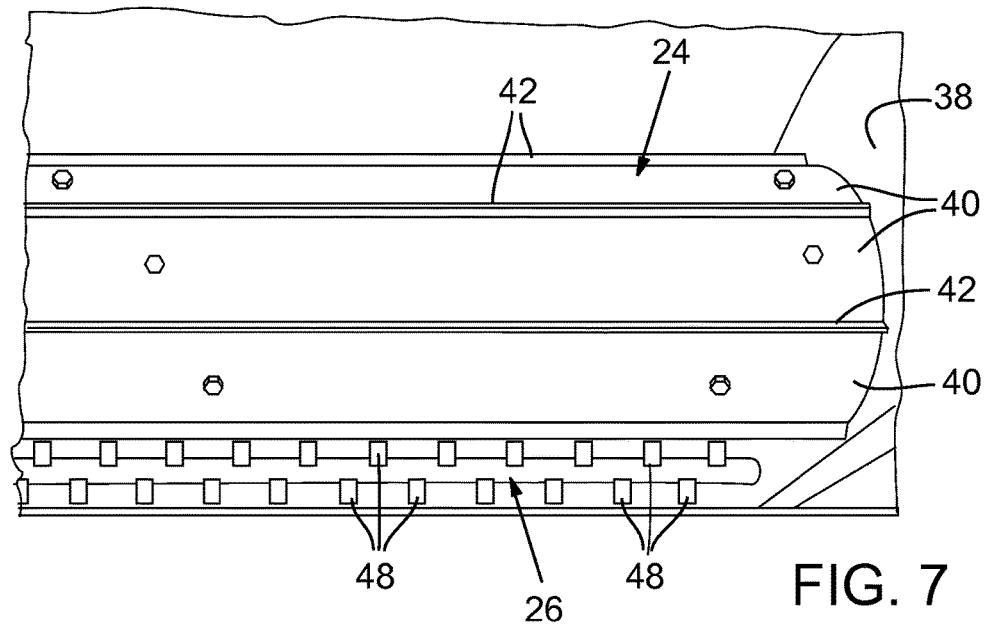
FIG. 7 is an enlarged perspective view showing a portion of the feed roller and commutator of the dispensing apparatus, as viewed through the inlet opening of the dispensing apparatus.

Referring to FIGS. 2 and 6-7, the feed roller 24 comprises a shaft 46 (FIG. 2), the opposite ends of which are mounted for rotational movement to the end walls 38 of the upper housing portion 18 (FIG. 6). One end of the shaft 46 is coupled to the first motor 32. The feed roller 24 can comprise a plurality of axially extending slats 40 that are secured to the shaft and a plurality of angularly spaced paddles, or blades, 42 positioned between adjacent slats 40 and extending radially outwardly therefrom. In the illustrated embodiment, the slats 40 are formed from sections of PVC pipe that are secured to the shaft, and the blades 42 are made of stainless steel.

In an embodiment, the blades 42 desirably extend uninterrupted in the axial direction substantially the entire length of the feed roller and radially a distance that forms a tight clearance with respect to the side walls 44 of the upper housing portion 18.

In an embodiment, the blades 42 are sized such that they desirably do not contact the side walls 44 but prevent or minimize product from flowing unregulated between the ends of the blades and the inner surfaces of the side walls. Material to be dispensed that is introduced into the upper housing portion 18 collects on top of the feed roller 24, which when rotated allows the material to pass to the lower portion of the upper housing in a controlled manner at a predetermined rate.

In another embodiment, the blades 42 may be configured so as to be flexible and long enough to contact and scrape the inner surface of the upper housing 18. The blades thus wipe material past and off this inner surface. In such an embodiment, the blades 42 can be made of a flexible food grade plastic, rubber or any suitable material or synthetic elastomer.

Material that contains moisture tends to agglomerate between the blades 42 of the feed roller and against the adjacent surfaces of the housing. The commutator 26 assists in breaking up the agglomerate before passing into the lower housing portion 20.

The commutator 26 can comprise a shaft 46 and a plurality of blades 48 extending radially outwardly from the shaft 46. The opposite ends of the shaft 46 are mounted for rotational movement to the end walls 38 of the upper housing portion 18. One end of the shaft 46 is coupled to the second motor 34. As best shown in FIGS. 2 and 7, the blades 48 desirably are arranged in multiple rows that extend along the length of the shaft. Each row includes a plurality of blades 48 that are spaced apart from each other along the length of the shaft. Each row of blades is angularly spaced (rotationally offset) from an adjacent row of blades. Moreover, each blade 48 can be offset in the axial direction with respect to the closest blades in the adjacent rows. The shaft 46 and the blades 48 can be made of stainless steel, plastic, rubber, or other suitable materials. As depicted in FIG. 2, the commutator 26 desirably is positioned such that the blades 48 can extend to just below without contacting the blades 42 of the feed roller to assist in removing material from the feed roller.

In alternative embodiments, the commutator 26 can be positioned closer to the feed roller 24 to contact the blades 42 and/or slats 40 of the feed roller during operation. In such embodiments, the commutator 26 can have blades 48 made of a food grade plastic or rubber or the blades can be replaced with flexible bristles that are positioned to swipe material off the surface of the feed roller 24. In addition, an optional vibrating device can be mounted on the housing proximate the location of the commutator to help dislodge material that adheres to the feed roller 24 or inner surfaces of the housing side walls 44.

Various factors can affect material adhering to the feed roller 24 and subsequent dislodging of that material. Some factors relate to properties of the material being dispensed. These material-related factors include but are not limited to whether that material is wet, dry, fine, coarse, hot, cold, oily, not oily, having glutinous or other adhesive composition or not, and further including gradations in between these opposing and interrelated descriptions.

Other factors relate to the interaction of the material with the dispensing apparatus, its components, and especially the feed roller and the housing. These apparatus-related factors include the speed of rotation of the feed roller, the composition of the surfaces of the feed roller, for example whether presenting a food grade rubber, plastic, or metal surface. Also the dimensions and proportions of the dispensing apparatus 10 play a role. These dimensions and proportions include the size of the free spaces above and below the feed roller within the upper housing 18, through which material moves, and, especially the size of the intermittent spaces defined by the passing of adjacent feed roller blades 42 near the inner surface of the housing 16. Such spaces are intermittently enclosed on two sides between the housing and the outer cylindrical surface of the feed roller (of diameter D, excluding the blades) and on two sides by the surfaces of the adjacent blades. These spaces are smaller in a circumferential direction when the blades are in closer proximity around the circumference of the feed roller. And these spaces are especially smaller when the blades are shorter along the radial dimension of the feed roller, and the outer surface of the feed roller, excluding the blades, is greater in diameter D and in closer proximity to the housing of width W. This is to say that these spaces are smaller when D is closer in size to W in FIG. 2. The volume of these spaces is directly related to the flow cross-section described above. The diameter D of the feed roller can be varied, depending on the material to be dispensed, by adding additional slats 40 between adjacent blades 42 to increase the diameter D and decrease the size of the "feed compartments" (the spaces defined between adjacent pairs of blades 42, the inner surface of the housing, and the outer surfaces of slats 40). Conversely, slats 40 can be removed, or replaced with thinner slats 40 to increase the size of the feed compartments.

Normally the outer ends of the blades, at the maximum radius of the feed roller, are designed to pass in close proximity to the housing. Depending then on the volume of these spaces, the speeds of rotation and configuration of the various components of the dispensing apparatus, the properties for material being dispensed, and the rate of introduction of material into the apparatus, material may be trapped more tightly in these spaces and/or may tend to adhere more to the feed roller, including after the blades move away from the housing.

In an embodiment, the apparatus may not be symmetrical from left to right across FIG. 2. The feed roller may not be exactly centered, or the angle of the sides of the housing may not be the same on both sides of FIG. 2. In such an embodiment, the spaces described above may be larger on one side relative to the other side due to the sizes and proximities described above being different on one side relative to the other side. In such an embodiment, or for other reasons creating asymmetry, operating the feed roller with one direction of rotation or the other may advantageously increase or decrease the extent to which material adheres to the feed roller as the material flows through one asymmetric side or the other.

Separately, changing the direction of rotation of any of the rotating components during operation may dynamically and advantageously increase or decrease the extent to which material adheres to that component or other components, as the material flows through the apparatus. This simply may be due to the mechanical shock of changing the direction of rotation, or this may be due to the reversal of any pattern of distribution of the material that resulted from the preceding direction of rotation.

In an embodiment, an advantageous mode of operation of the commutator may be choke feeding in which sizes, proximities, directions, and speeds of components of the apparatus are set so that material arrives in intermittent groups or clusters at the commutator, allowing the commutator to fractionate and transport material for a period of time and then to rotate relatively cleanly or unloaded for a period of time, none the less resulting in a more uniform final dispensing of material from the apparatus.

The side walls 44 of the upper housing portion 18 can have lower portions 66 that curve inwardly towards each other and define an outlet opening, or transfer opening, 68 below the commutator 26. The curved side wall portions 66 help direct material through the opening 68 into the lower housing portion 20.

In another embodiment, the commutator 26 may be positioned below the transfer opening 62 so that the transfer opening exits above and directs the flow of material to the commutator. This may be advantageous when the material is less adherent to the feed roller 24 but still requires fractionation. In this embodiment, the lower housing 20 may be enlarged in the vertical direction to accommodate the commutator.

In another embodiment, the dispensing apparatus 10 may comprise two commutators. A first commutator 26 is configured and positioned as shown in FIGS. 2 and 7. A second commutator is configured as described previously for the single commutator but positioned below the transfer opening as described above. This may be advantageous when the material is partially adherent to the feed roller 24 and still requires fractionation. In this embodiment, the lower housing 20 may be enlarged in the vertical direction to accommodate the additional commutator. The second commutator may be driven by the same motor as the first commutator or may be driven by a dedicated motor at the same or different speeds and/or directions than the first commutator. The mechanism for linking the second commutator to its drive motor and the speed and direction of rotation would be similar to that described for the first commutator-motor pair.

Figure 9:
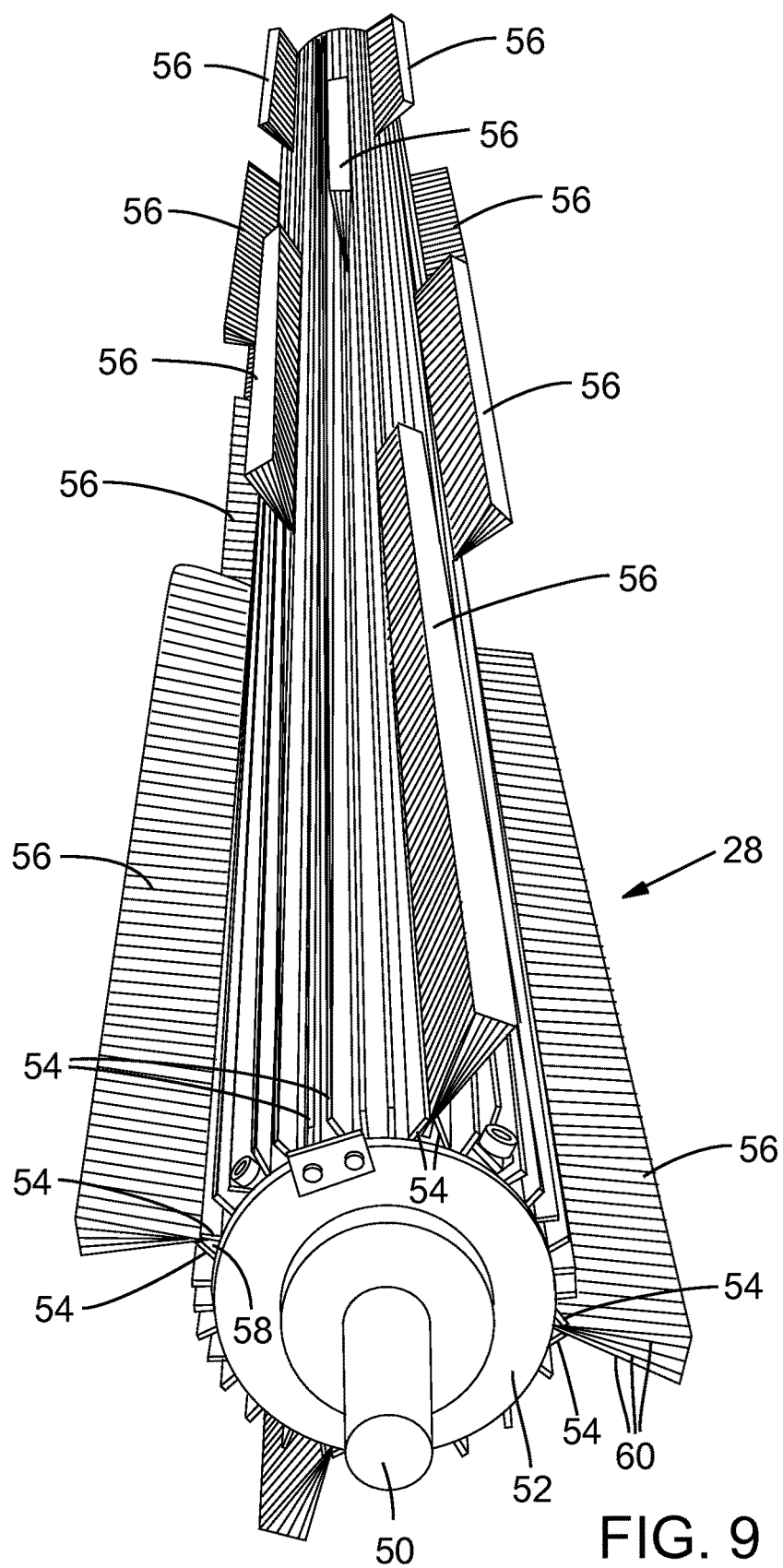
FIG. 9 is a perspective view showing the applicator of the dispensing apparatus.

Referring to FIG. 9, the applicator 28 can comprise a substantially cylindrical shaft 50 that supports an outer housing, or hub, 52, creating a substantially cylindrical shape. The opposite ends of the shaft 50 are mounted for rotational movement to the end walls of the lower housing portion 20. One end of the shaft 50 is coupled to the third motor 36. The housing 52 comprises a plurality of protrusions 54. The protrusions 54 extend radially outwardly from the outer surface of the housing 52 and axially along the length of the housing 52. Spaces are defined between adjacent protrusions for mounting multiple brushes 56 to the housing. Each brush 56 can comprise a plurality of food grade flexible bristles 60 mounted on a spline 58. To secure a brush 56 to the housing, the spline 58 is placed between two protrusions 54, which can then be bent towards each other to capture the spline between the two protrusions. The lower portion of the lower housing portion 20 can be curved so that the bristles 60 can contact the adjacent inner surfaces and sweep material off of those surfaces and across and through the perforated cover 30.

As can be seen in FIG. 9, the brushes 56 can be positioned at various locations on the housing 52. Although not required, each brush 56 in the illustrated embodiment extends about ¼ the length of the applicator. The brushes 56 can be arranged in four sets of brushes positioned end-to-end along the length of the housing 52. Each set can comprise, for example, four angularly spaced brushes. The brushes 56 of each set can be rotationally offset from the brushes of an adjacent set of brushes. The bristles 60 can comprise strands of food grade plastic, such as HDPE or UHMW.

Referring now to FIG. 8, the lower housing portion 20 can be formed with an outlet opening 62 that extends longitudinally along the lower housing portion at a location underneath the applicator 28. The opening 62 desirably is covered with a perforated cover 30 that cooperates with the applicator 28 to break the agglomerates as they pass through the opening 62. In the illustrated embodiment, the opening 62 does not extend uninterrupted along the length of the lower housing portion and instead can include multiple openings spaced along the length of the lower housing portion, each of which is covered by a respective perforated cover 30. For purposes of illustration, one of the perforated covers 30 is removed from the lower housing portion in the view shown in FIG. 8 to show a brush 56 positioned near a respective opening 62. Each perforated cover 30 can be mounted on a perforated cover support comprising, for example, plates 64 that are configured to mount the perforated cover directly below a respective opening 62. Utilizing multiple perforated covers 30 placed under respective openings 62 facilitates cleaning and removal of material that becomes clogged at locations along the length of the lower housing portion 20. In an alternative embodiment, the lower housing portion 20 can be formed with a single uninterrupted opening 62 below the applicator and a single perforated cover positioned to cover the opening 62.

Figure 2A:
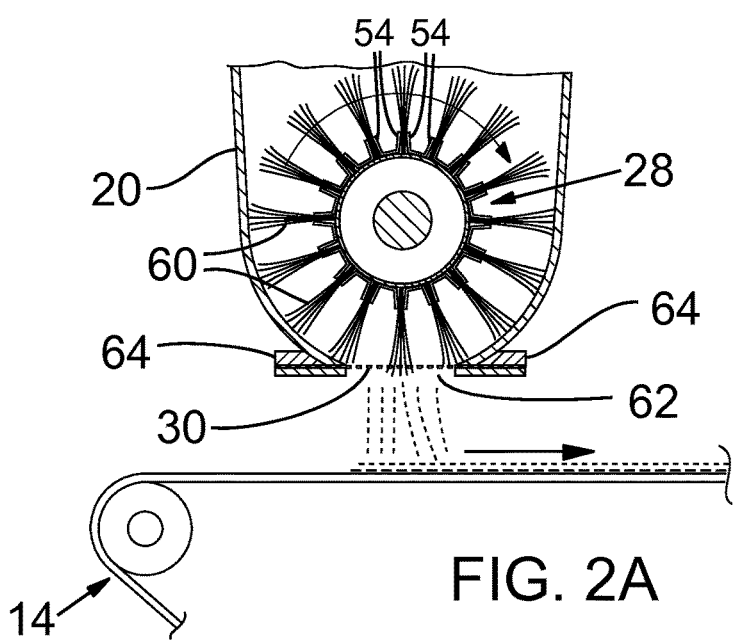
FIG. 2A is an enlarged view of a portion of FIG. 2.

As shown in FIGS. 2 and 2A, the bristles 60 desirably are sized such that they extend through the openings in the perforated cover 30 to ensure that product is scraped or swept against the perforated cover as the product is dispensed through the outlet opening 62 and to minimize build-up of product on the perforated cover. In particular embodiments, for example, the bristles 60 can be sized such that their end portions extend about ⅛ inch to about ¼ inch past the perforated cover 30. In other particular embodiments, the bristles 60 desirably are sized such that they extend only to the upper surface of the perforated cover 30.

In addition to changing the length of the bristles 60, additional particular embodiments include changing the positioning of the applicator 28 relative to the perforated cover 30 to control the interaction of the bristles 60 with the perforated cover 30 while independently controlling bristle length. Thus, it may be desirable to have shorter or longer bristles, independent of the interaction between the bristles 60 and the perforated cover 30. This might be the case for example in additionally and independently controlling the interactions of the bristles 60 with either the lower housing 20 inner surface or with the commutator 26.

The size of the openings in the perforated cover can depend on various factors, including the moisture content of the product being dispensed and the desired maximum agglomerate size within the product. In certain embodiments, the perforated cover 30 can have openings in the range of about ⅛ inch to about ½ inch, with perforated cover openings of about ⅛ inch, ¼ inch, and ½ inch being specific examples.

An additional factor in selecting bristle 60 length, and in positioning the commutator 26 and the applicator 28 relative to each other, is whether contact is desired between the commutator 26 and the applicator 28. In one embodiment, the applicator 28 does not contact the commutator 26. See FIG. 2. In another embodiment, longer bristles 60 or more proximate positioning of the commutator 26 and applicator 28, allow the bristles 60 of the applicator 28 to contact the commutator 26 or its blades 48. This allows the applicator 28 to assist in dislodging material from the commutator 26, and this may be desirable in dispensing materials having a greater tendency to adhere to the commutator 26.

Drying certain types of fruit pulp may require the product to be conveyed through the dryer multiple times before it is adequately dried. With each pass through the dryer, the fruit pulp becomes more tacky and paste-like in consistency and less capable of forming an even layer on the conveyor. Thus, as the product loses moisture, it may be desirable to decrease the size of the openings in the perforated covers 30 for subsequent passes through the dryer to produce smaller agglomerates that are dispensed onto the conveyor.

In a specific implementation for drying fruit pulp, the fruit pulp is first ground into pieces about ½ inch or less in size, and preferably less than about ¼ inch in size. The ground product is transferred into the dispensing apparatus 10, such as by an auger that pushes the product into the dispensing apparatus. The dispensing apparatus is initially equipped with screens 30 having ½-inch square openings. The dispensing apparatus 10 dispenses the product onto the conveyor 14, which conveys the product through the dryer. The product can be subjected to multiple passes through the dryer until all or substantially all moisture is removed from the product. After each pass through the dryer, the product is transferred back into the dispensing apparatus 10, which again dispenses the product onto the conveyor. After about the second pass through the dryer, the screens 30 can be replaced with screens having smaller openings, such as screens with ¼-inch openings.

For dispensing fine particles or moist or dry powders (such as botanical powders), the dispensing apparatus can be equipped with perforated covers comprising screens having ⅛-inch openings. For dispensing relatively large particles (for example, particles greater than ½ inch, such as pieces of onion), the perforated covers can be one or more elongated bars or rods 70 that extend along the long dimension of the lower housing portion directly below the outlet opening 62 (as shown in FIG. 10). When there is a plurality of bars, they can be spaced apart from each other a predetermined distance to allow pieces of material to fall through the gaps between the bars and onto the conveyor surface.

As noted above, the drying apparatus 8 in some applications is not necessarily used for drying moisture-laden product but instead functions as a heating apparatus that heats product to a temperature sufficient to sterilize the product. In this regard, the dispensing apparatus 10 can also be used to handle and dispense relatively dry material onto the conveyor 14 for sterilization. Some examples of such materials include different parts of a plant, such as leaves and roots, which can be ground into smaller pieces or into a powder before being introduced into the dispensing apparatus.

In view of the many possible embodiments to which the principles of the disclosed invention may be applied, it should be recognized that the illustrated embodiments are only preferred examples of the invention and should not be taken as limiting the scope of the invention. We therefore claim as our invention all modifications and variations that fall within the scope of the following claims.

We claim:
1. A method comprising:
introducing material into an inlet opening of a dispensing apparatus comprising a housing;
dispensing the material from the dispensing apparatus through a perforated cover of the dispensing apparatus by rotating a first rotor within the housing, wherein the first rotor comprises a shaft and a plurality of brushes that brush the material against the perforated cover as the first rotor is rotated;
rotating a second rotor within the housing, wherein the second rotor is located above the first rotor and comprises a shaft and a plurality of radially extending blades, and rotation of the second rotor causes the material to pass through the housing from the second rotor toward the first rotor at a predetermined rate; and
rotating a third rotor within the housing, wherein the third rotor comprises a shaft and a plurality of radially extending blades, wherein the third rotor is positioned below the second rotor and above the first rotor and along a path along which the material flows from the second rotor to the first rotor;
wherein a rotational speed of the third rotor is greater than a rotational speed of the second rotor;
wherein the first, second, and third rotors are rotated by first, second, and third motors, respectively, and selecting the rotational speeds of the rotors comprises controlling the rotational speeds of the motors.

2. The method of claim 1, wherein rotation of the third rotor is effective to fractionate the material as it flows from the second rotor to the first rotor by breaking up large agglomerated pieces of the material into smaller pieces of the material.

3. The method of claim 1, wherein the perforated cover is stationary relative to the housing.

4. The method of claim 3, wherein the perforated cover is a screen.

5. The method of claim 1, wherein the plurality of brushes of the first rotor further comprise a plurality of flexible bristles that extend through the perforated cover as the applicator rotates relative to the perforated cover.

6. The method of claim 5, wherein the end portions of the bristles extend past the perforated cover as the first rotor rotates relative to the perforated cover and the bristles come in contact with the cover.

7. The method of claim 1, wherein at the introducing step, the material introduced comprises fruit or vegetable pulp.

8. The method of claim 7, wherein the material is dispensed onto a conveying surface and is conveyed through a drying apparatus that causes moisture to be removed from the material.

9. The method of claim 8, further comprising removing the material from the drying apparatus and reintroducing the material into the dispensing apparatus to dispense and convey the material through the drying apparatus at least one additional time.

10. The method of claim 1, wherein the blades of the second rotor extend axially along the length of the second rotor and radially outward from the shaft of the second rotor such that as the second rotor is rotated, respective outer ends of the blades of the second rotor successively arrive in close proximity to opposing inner surfaces of the housing and inhibit material from flowing unregulated between the outer ends of the blades and the adjacent inner surfaces of the housing.

11. The method of claim 1, further comprising:
rotating a fourth rotor, which comprises a shaft and a plurality of radially extending blades, wherein the fourth rotor is positioned along the path along which the material flows from the second rotor to the first rotor.

12. The method of claim 1, wherein the act of dispensing further comprises depositing a desired thickness of the material onto a conveying surface, and the method further comprises selecting the rotational speeds of the rotors to achieve the desired thickness.

13. The method of claim 1, wherein a rotational speed of the first rotor is greater than the rotational speed of the second rotor.

14. A method comprising:
introducing fruit or vegetable pulp into a dispensing apparatus comprising a housing, a first rotor disposed in the housing and comprising a shaft and a plurality of brushes supported on the shaft, a second rotor disposed in the housing and comprising a shaft and a plurality of radially extending blades, and a third rotor disposed in the housing and comprising a shaft and a plurality of radially extending blades, wherein the third rotor is located above the first rotor and the second rotor is located above the third rotor;
rotating the second rotor to cause the fruit or vegetable pulp to flow from the second rotor toward an outlet of the housing at a predetermined rate;
rotating the third rotor, which breaks up agglomerated pieces of fruit or vegetable pulp into smaller pieces of fruit or vegetable pulp as the fruit or vegetable pulp flows from the second rotor to the first rotor; and
rotating the first rotor, which brushes the fruit or vegetable pulp against a perforated cover at an outlet of the housing, causing the fruit or vegetable pulp to be dispensed from the housing;
wherein the first, second, and third rotors are rotated by first, second, and third motors, respectively, and selecting the rotational speeds of the rotors comprises controlling the rotational speeds of the motors.

15. The method of claim 14, wherein the third rotor is rotated at a greater rotational speed than the second rotor.

16. The method of claim 15, wherein the first rotor is rotated at a greater rotational speed than the second rotor.

17. The method of claim 14, wherein the fruit or vegetable pulp is dispensed onto a conveying surface to form a layer of the fruit or vegetable pulp having a desired thickness and the method further comprises selecting the rotational speeds of the rotors to achieve the desired thickness.

18. The method of claim 17, wherein the first rotor is rotated at a speed of about 120 rpm to about 215 rpm, the second rotor is rotated at a speed of about 0.3 rpm to about 0.9 rpm, and the third rotor is rotated at a speed of about 500 rpm to about 1000 rpm.

19. The method of claim 14, wherein the housing comprising opposing inner side surfaces that extend along on opposite sides of the second rotor and the blades of the second rotor form a tight clearance with the inner side surfaces to inhibit the fruit or vegetable pulp from flowing unregulated between the blades and the inner side surfaces.

* * * * *